A. T. HEIKES.
POTATO PLANTER.
APPLICATION FILED JUNE 13, 1910.
997,674.
Patented July 11, 1911.
6 SHEETS—SHEET 3.
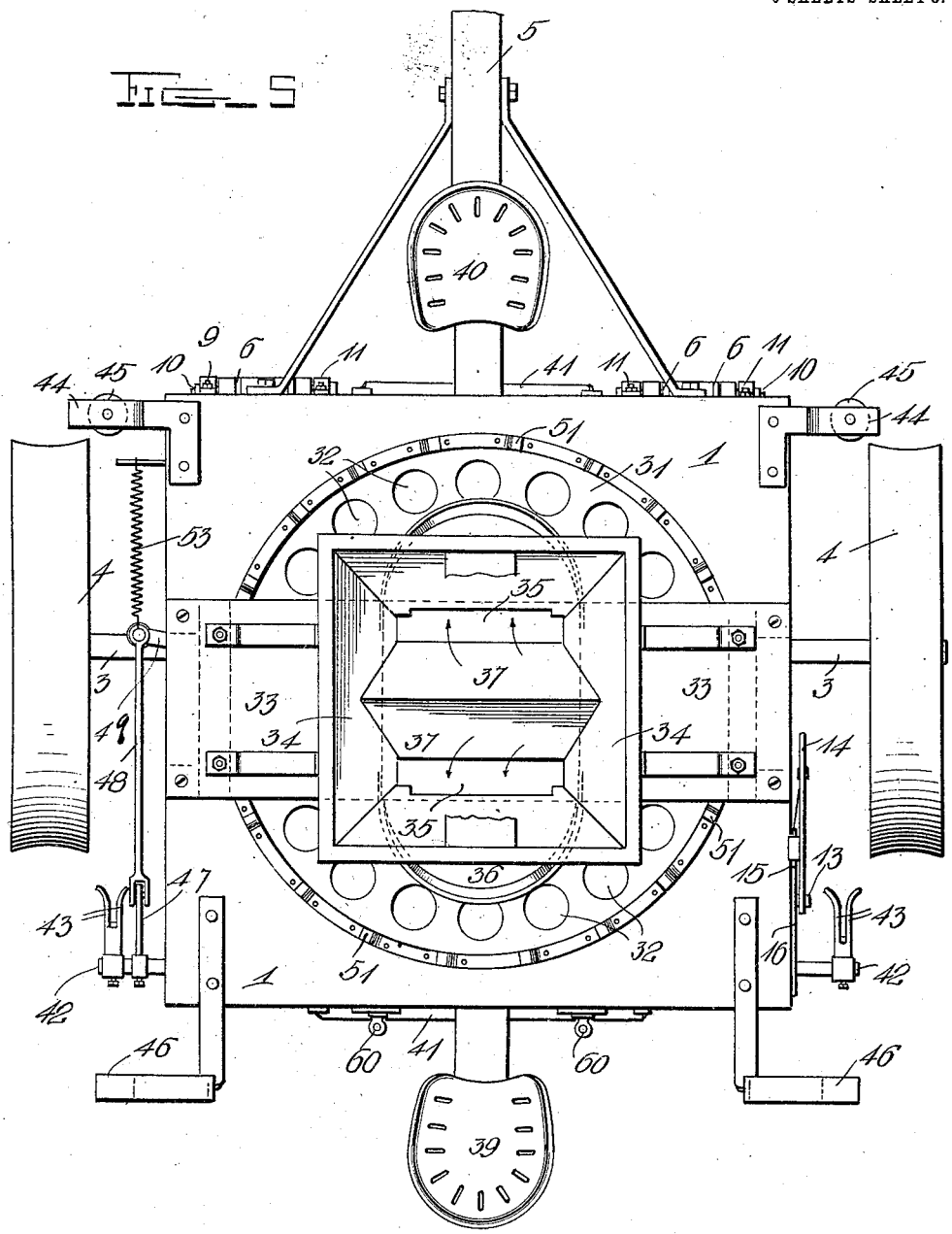
Witnesses
C. H. Griesbauer
Inventor
A. T. Heikes
by H. B. Willson & Co.
Attorneys A. T. HEIKES.
POTATO PLANTER.
APPLICATION FILED JUNE 13, 1910.
997,674.
Patented July 11, 1911.
6 SHEETS—SHEET 4.
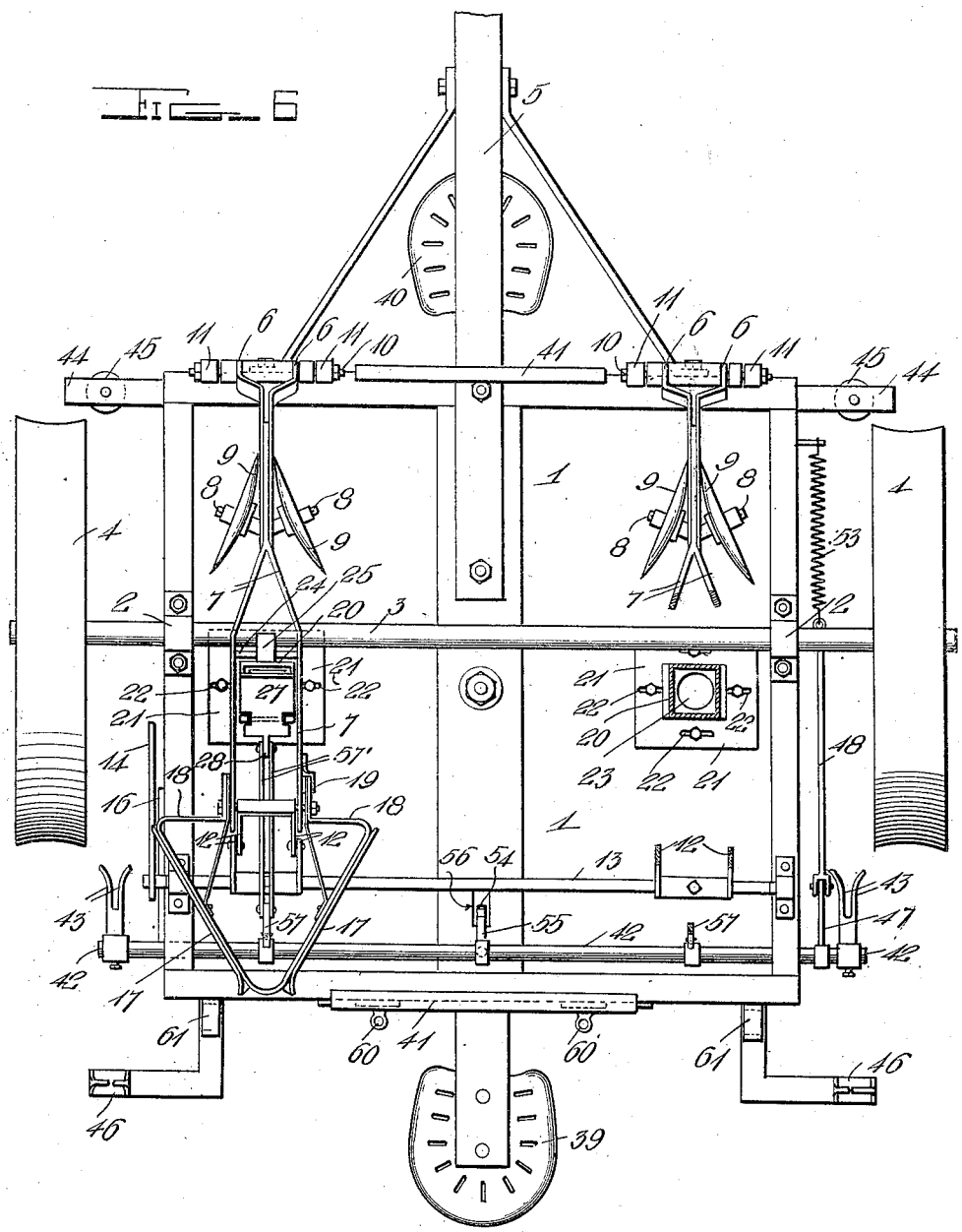

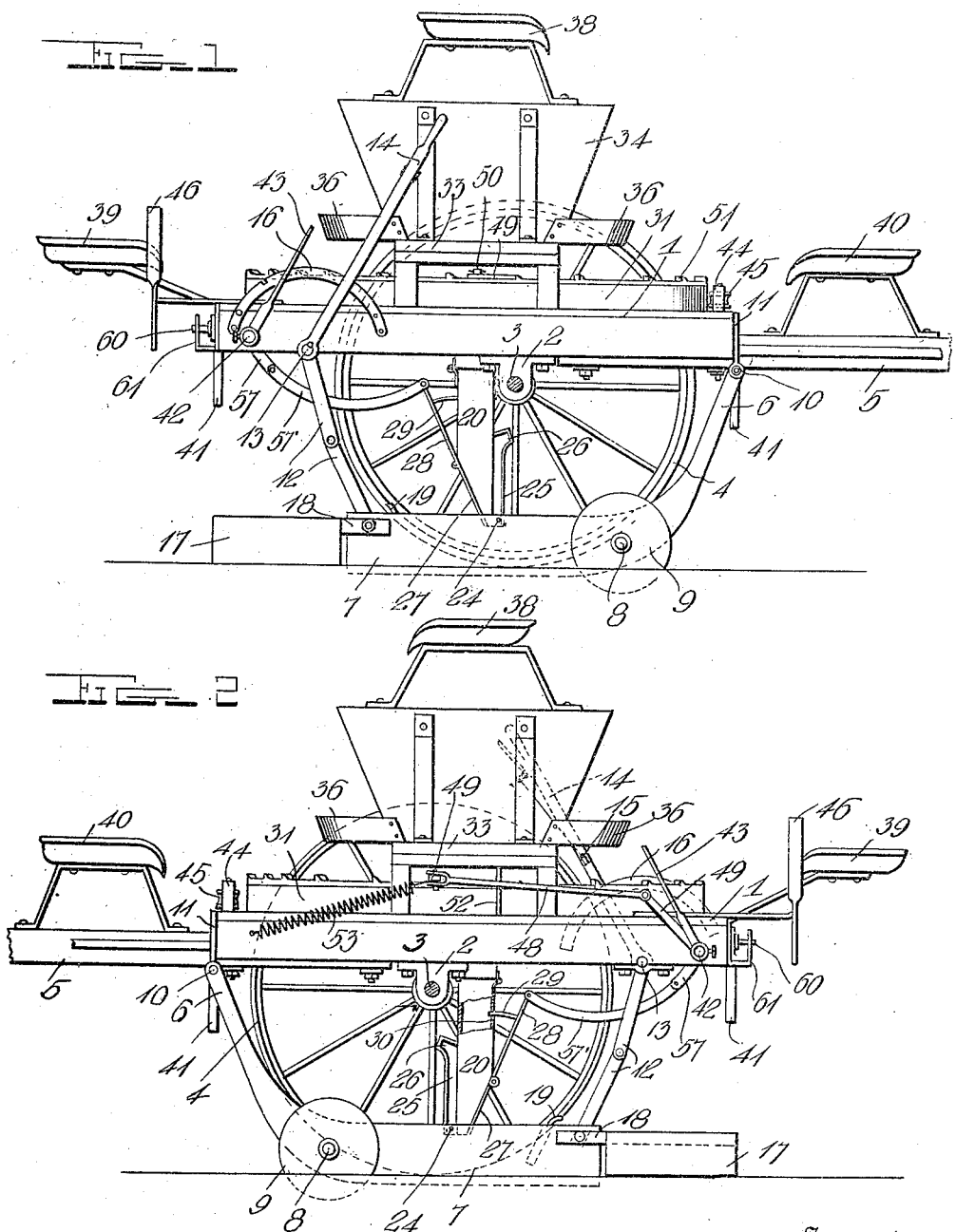

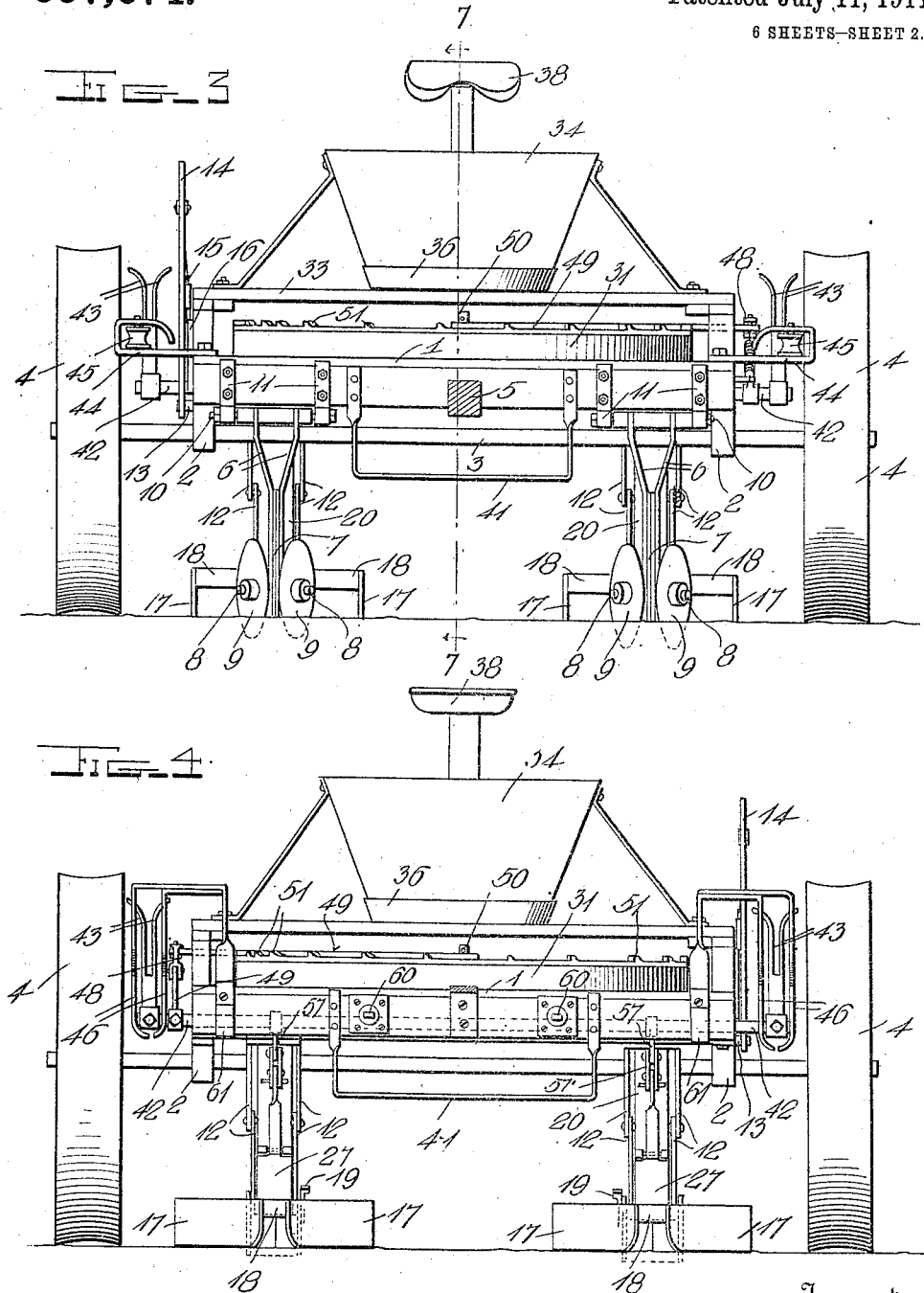

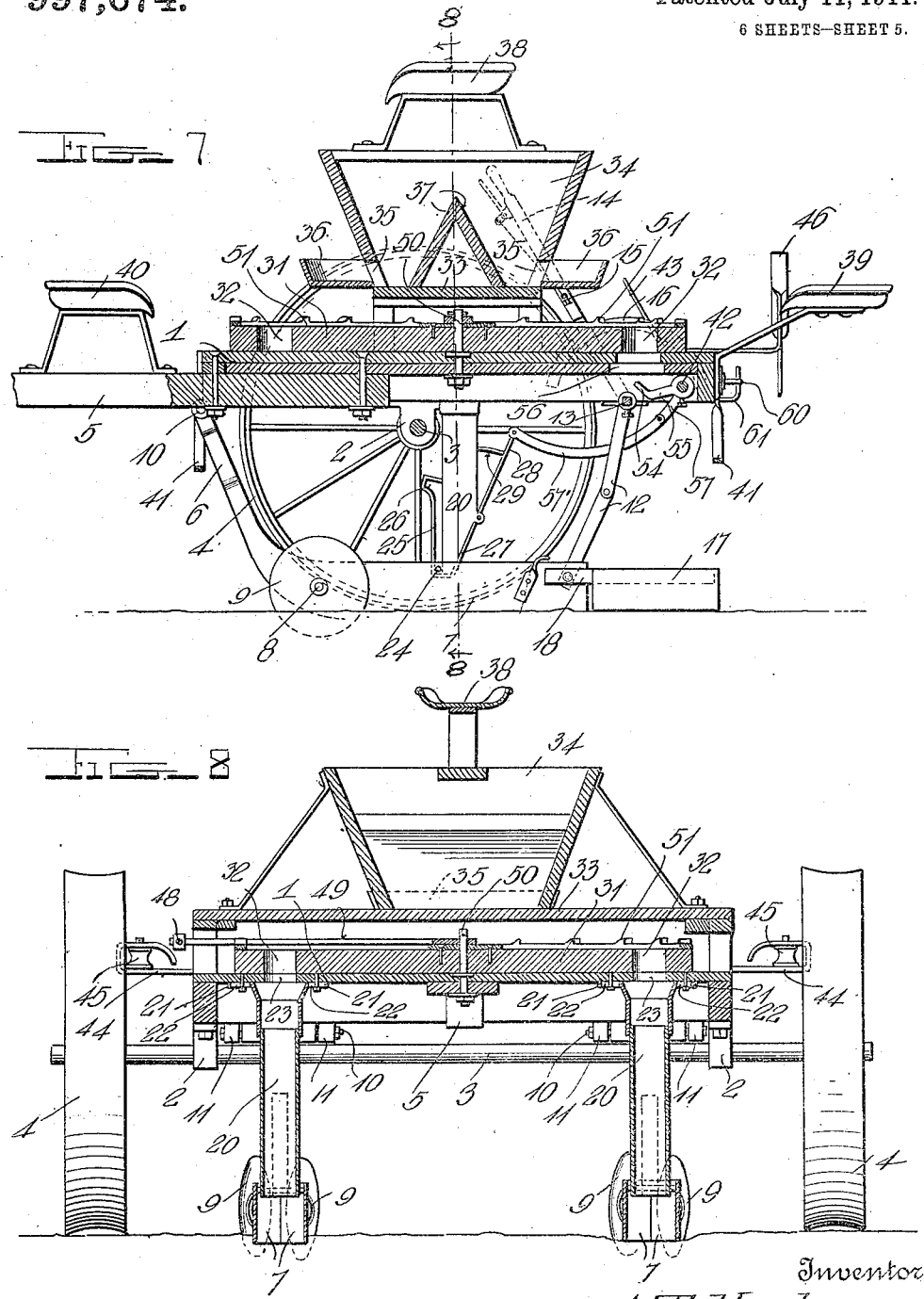

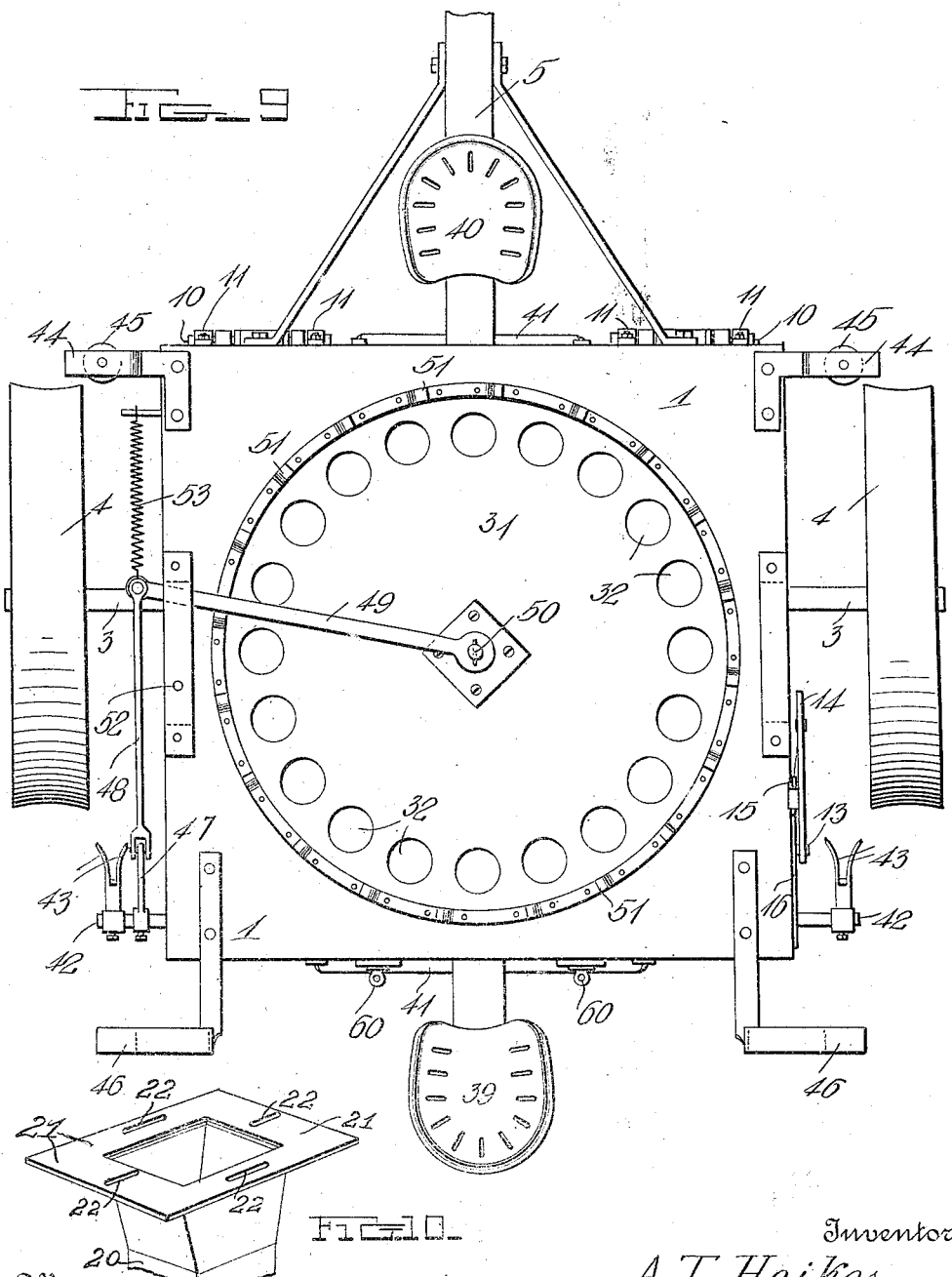

UNITED STATES PATENT OFFICE.

ARISTA T. HEIKES, OF KALKASKA, MICHIGAN.

POTATO-PLANTER.

997,674.  Specification of Letters Patent.   Patented July 11, 1911.

Application filed June 13, 1910. Serial No. 566,547.

*To all whom it may concern:*

Be it known that I, ARISTA T. HEIKES, a citizen of the United States, residing at Kalkaska, in the county of Kalkaska and State of Michigan, have invented certain new and useful Improvements in Potato-Planters; and I do declare the following to be a full, clear, and exact description of the invention, such as will enable others skilled in the art to which is appertains to make and use the same.

This invention relates to improvements in potato planters.

One object of the invention is to provide a planter of this character having an improved construction of seed feeding mechanism whereby the exact quantity of seed is dropped each time into the furrow.

Another object is to provide an improved means for operating the feeding mechanism at the proper time and means for opening the furrow and closing the same after the seed has been planted.

With these and other objects in view the invention consists of certain novel features of construction, combination and arrangement of parts as will be more fully described and particularly pointed out in the appended claims.

In the accompanying drawings: Figure 1 is an elevation of one side of the machine; Fig. 2 is a similar view of the opposite side; Fig. 3 is a front elevation; Fig. 4 is a rear elevation; Fig. 5 is a top plan view; Fig. 6 is a bottom plan view; Fig. 7 is a central vertical longitudinal section of the machine on the line 7—7 of Fig. 3; Fig. 8 is a central vertical transverse section of the machine on the line 8—8 of Fig. 7; Fig. 9 is a plan view with the seed hopper removed; Fig. 10 is a detail perspective view of the upper end of one of the feed chutes.

Referring more particularly to the drawings, 1 denotes the platform of my improved potato planter on the under side of which are suitable bearings or brackets 2 in which is mounted the shaft or axle 3 of the machine. On the ends of the axle 3 are revolubly mounted the supporting wheels 4, and to the front end of the platform 1 is secured, in any suitable manner, a draft tongue 5.

Hingedly and adjustably connected to the front end of the machine, adjacent its opposite sides, are the upwardly curved ends 6 of furrow opening shoes or runners 7 which are in the form of rearwardly projecting outwardly flaring blades. Revolubly mounted on the stub axles 8 secured in the front ends of the runners 7 are furrow opening disks 9 which are provided to start the furrows which are completed or opened to the desired width by the rearwardly projecting blades of the runners. The upwardly projecting front ends 6 of the runners are pivotally mounted on short shafts 10, which are secured in brackets or hangers 11 depending from the front end of the platform 1 as shown. The shafts 10 are inserted through spacing sleeves and are clamped to the brackets by nuts on their ends. A number of spacing sleeves of various lengths are provided so that, by using the proper sleeves, the furrow openers may be shifted laterally as desired, and thus arranged to form furrows at different distances apart.

The rear ends of the runners are connected to the lower ends of jointed raising and lowering links 12, the upper ends of which are secured to collars secured rigidly on a raising and lowering shaft 13 which is journaled in suitable bearings on the under side of the platform 1, as shown. One end of the shaft 13 projects laterally beyond the platform and is equipped with a lever 14 carrying a locking pawl 15 adapted to be engaged with a segmental rack 16 whereby the runners may be raised or lowered as will be readily understood, to vary the depth of the cut or to be supported above the ground in an inoperative position.

Arranged at the rear end of each runner 7 are pairs of rearwardly converging covering blades 17, which are secured to the opposite sides of substantially triangular supporting frames 18, the said frames being pivotally connected to the rear ends of the runners 7 whereby the frames and covering blades may be raised or lowered. When a frame 18 with the blades 17 carried thereby is raised or swung upwardly the frame may be engaged by a catch 19 on the runner whereby said frame and covering blades will be held up in an inoperative position.

Arranged below the platform 1 adjacent each side thereof and extending downwardly between the rearwardly projecting blades of the runners 7, are feed chutes 20 which are preferably formed in upper and lower hingedly connected sections. The short upper section of the chute is provided with an enlarged or flared upper end having outwardly projecting right angular attaching flanges 21 provided with slots 22 through which fastening bolts are inserted to secure the chutes to the under side of the platform in exact alinement with seed discharging openings 23 formed therein. By thus adjustably connecting the upper ends of the chutes to the platform, said chutes may be adjusted laterally with the furrow opening shoes when the latter are adjusted for forming furrows at different widths or distances apart. The lower ends of the feed chutes project between the blades of the runners and the chutes are slidably connected with said runners by means of cross bars 24 which engage guide bars 25 secured to the front sides of the chutes as shown. The upper end of each guide bar 25 is bent to form an offset or recess 26 which receives the cross bar 24 when the runners are swung upwardly. By thus hingedly connecting the upper and lower sections of the chutes, the lower sections will be swung upwardly by the cross rods 24 of the runners when the latter are swung upward into an inoperative position. The lower end of each chute is beveled or inclined to form a valve seat with which is engaged a lower feed valve 27 which is hinged to the lower rear side of the chute and is adapted to be swung from and to the lower end of the chute for the purpose of opening and closing the same. The valve plate 27 is connected to the lower end of an operating bar 28 which projects upwardly and has secured thereto, at a suitable distance above the valve 27, an upper feed valve 29 which works through a slot 30 in the rear side of the chute and is adapted to open and close said chute. The upper end of the valve operating lever 28 is connected to a suitable operating mechanism hereinafter described whereby said valves are operated alternately to let the seed into the lower portion of the chute and to discharge the same therefrom.

Revolubly mounted on the platform 1 is a horizontally disposed feed wheel 31 provided near its edge with an annular series of seed pockets or passages 32 by means of which the seed is carried to and discharged through the openings 23 in the opposite sides of the platform into the upper ends of the chutes 20. Mounted on the platform 1, immediately above the feed wheel 31, is a hopper bottom 33 on which is arranged a seed hopper 34 having seed discharging passages 35 formed in the lower ends of its front and rear sides. Arranged on the front and rear sides of the hopper around the feed openings 35 are seed pans or boxes 36 into which the seed falls from the hopper. In the hopper is formed a centrally disposed deflecting board 37 whereby the seed is evenly deflected through the opposite discharge openings 35. The hopper 34 is supported by suitable braces and on the upper end of the hopper is arranged a driver's seat 38. On the rear end of the platform opposite the rear seed boxes 36 is arranged a feeder's seat 39 while on the tongue adjacent to the front end of the platform and the front feed box is arranged a second feeder's seat 40. The seats 39 and 40 are occupied by operators who manually remove the seed from the pans or boxes 36 and drop the desired quantity for each hill into the consecutive seed pockets or passages 32 in the feed wheel. By this means the exact desired quantity of seed will be planted in each hill. Secured to the front and rear ends of the platform are depending foot rests 41 which are adapted to be engaged by the feet of the feeders occupying the seats 39 and 40.

The operating mechanism for the feed wheel 31 and the valves in the feed chutes comprises a rock shaft 42 which is mounted in suitable bearing brackets on the under side of the platform adjacent its rear end. On the outer ends of the shaft 42 are secured tripping forks 43 either of which is engaged by a suitably connected check line (not shown) whereby as the machine is drawn across the field the shaft 42 will be periodically rocked. The said check line passes through suitable guide brackets 44 which are secured to the opposite sides of the front end of the platform and have revolubly mounted therein guide rollers 45. The check line is prevented from jumping out of engagement with the tripping forks 43 by guide brackets 46 secured to the opposite sides of the rear end of the platform as shown. Fixedly mounted on one end of the rock shaft 42 is a crank arm 47 which is connected by a connecting rod or link 48 to the outer end of a feed wheel operating lever 49, the inner end of which is pivotally mounted on the shaft 50 of the feed wheel. The outer portion of the lever 49 is adapted to engage an annular series of ratchet teeth 51 on the upper side of the feed wheel adjacent its edge whereby when the rock shaft is tripped by the check line and the lever 49 thereby swung or pulled back, the feed wheel will be turned the distance of one tooth thereby bringing the feed pockets 32 into successive engagement or alinement with the feed openings 23 in the platform 1 and permitting the seed in said pockets to drop through said openings and into the feed chutes. The lever 49 is limited in its rearward movement, to prevent the wheel from being pulled around too far, by a stop bolt 52 which is arranged in one side of the platform and the adjacent end of the hopper bottom as shown. When the rock shaft has been released by the check line said shaft is rocked in the opposite direction and the lever brought back in position to engage the next tooth of the feed wheel by a coiled spring 53 which is connected to the outer end of the lever and to the front end of the adjacent side of the platform as shown.

In order to positively insure the stopping of the feed wheel when the pockets therein are in alinement or register with the discharge openings 23 in the platform, I provide a stop finger 54 formed on the end of a crank arm 55 fixed on the shaft 42 and adapted to be swung by the movement of said shaft to project said finger upwardly through a slot 56 in the platform 1 and into engagement with the pockets in the feed wheel thus operatively holding the latter against rotary movement while the finger is in engagement therewith.

Adjustably connected to the rock shaft 42 by means of collars and set screws or other suitable fastening devices, are curved valve operating levers 57 the forward ends of which are connected to the upper ends of the valve operating bars 28 of the feed chute whereby when the shaft is rocked by the check line the valves of the feed chutes will be operated in the proper direction and at the proper time to let seed down into the chutes and to discharge the same into the furrows. By adjustably connecting the levers 57 to the shaft 42 said levers may be moved or adjusted with the runners and feed chutes.

Various changes in the form, proportion and the minor details of construction may be resorted to without departing from the principle or sacrificing any of the advantages of this invention as defined in the appended claims.

Having thus described my invention, what I claim is:

1. The combination of a platform having feed passages therein, a feed wheel mounted in the platform and having pockets adapted to register with the feed passages on the platform, means for rotating said wheel, and means on the platform to engage said wheel and lock it against movement when the pockets therein are in alinement with the feed passages in the platform.

2. The combination of a platform having feed passages therein, a feed wheel mounted on the platform and having pockets adapted to register with the feed passages in the platform, means for rotating said wheel, and a stop finger connected with said means and operated thereby to engage the feed wheel and arrest the movement of the same when pockets therein are in alinement with the feed passages in the platform.

3. The combination of a platform having feed passages therein, a feed wheel mounted on the platform and having pockets adapted to register with the feed passages in the platform, a rock shaft carried by the platform, means for actuating said rock shaft, connections between the rock shaft and the feed wheel to rotate the same, and a stop finger on said rock shaft to engage the feed wheel and lock the same against movement when pockets therein are in alinement with the feed passages in the platform.

4. The combination of a platform having feed passages therein, a feed wheel mounted on the platform and having a series of pockets, feed chutes depending from the platform in alinement with the feed passages therein, valves arranged in said chutes to control the passage of seed therethrough, a rock shaft mounted on said platform, tripping forks on the ends of said shaft adapted to engage a check line, means to connect said shaft with the valves in the chutes, means to connect said shaft with the feed wheel, and means to limit the movement of said shaft.

5. The combination of a platform having feed passages therein, a feed wheel mounted on said platform and having a series of pockets adapted to register with said feed passages, an annular series of ratchet teeth on the feed wheel, a pivotally mounted lever adapted to engage said teeth to turn the wheel, feed chutes arranged below the platform in alinement with the feed passages therein, valves arranged in said chutes, an operating bar connected to said valves, a rock shaft mounted on said platform, a lever connecting said shaft with said operating bar, a crank arm on said shaft, a rod connecting said arm with the wheel operating lever, means for actuating said rock shaft, and a stop arranged in the path of said lever to limit the movement.

6. The combination of a platform having feed passages therein, a feed wheel having pockets adapted to register with said feed passages, means to periodically operate said wheel, feed chutes arranged below the feed passages in the platform, furrow opening runners hinged to the platform and extending rearwardly, furrow opening disks rotatably mounted in the front ends of the runners, covering blades pivoted to the rear ends of the runners, and means on the runners to hold said covering blades raised in an inoperative position.

7. The combination of a platform having feed passages therein, a revolubly mounted feed wheel having pockets adapted to register with said feed passages, means to operate said wheel, feed chutes arranged below the feed passages in the platform, furrow opening runners hinged to the platform and extending rearwardly, furrow opening disks rotatably mounted in the front end of the runners, and latches pivoted on the runners to engage and hold the covering blades raised relatively to the runners.

8. The combination of a platform having feed passages therein, a wheel mounted on the platform having pockets adapted to register with said feed passages, means to operate said wheel, feed chutes arranged below the feed passages in the platform, and arranged to receive the seed from the chutes, disks rotatably mounted in the front ends of the runners, rearwardly converging the covering blades in the rear of the runners, triangular frames arranged between and secured rigidly to said blades, and pivoted to the rear ends of the runners, and means to hold the covering blades in an inoperative position.

9. The combination of a platform having feed passages therein, a feed wheel mounted on the platform, feed chutes depending from the platform around the feed passages therein, and consisting of hinged sections, furrow openers hinged to and depending from the platform, a shaft mounted on the platform, links connecting said shaft with the runners whereby the runners may be raised or lowered, and connections between the runners and the lower chute sections whereby said sections will follow the movement of the runners.

10. The combination of a platform having feed passages therein, a feed wheel on the platform, feed chutes depending from the platform, around the feed passages therein and consisting of hinged sections, furrow openers hinged to and depending from the platform, a shaft mounted on the platform, links connecting said shaft with the runners whereby the runners may be raised or lowered, guide bars on the front sides of the lower chute sections, and cross bars in the runners engaging said side bars.

In testimony whereof I have hereunto set my hand in presence of two subscribing witnesses.

ARISTA T. HEIKES.

Witnesses:
A. B. CORNELL,
HARRY L. MYERS.